United States Patent
Frank et al.

(10) Patent No.: US 10,791,280 B1
(45) Date of Patent: Sep. 29, 2020

(54) METHOD AND DEVICE TO ACQUIRE IMAGES WITH AN IMAGE SENSOR DEVICE

(71) Applicant: AUDIO TECHNOLOGY SWITZERLAND S.A., Romanel-sur-Lausanne (CH)

(72) Inventors: Thierry Frank, Romanel-sur-Lausanne (CH); Patrick Camina, Romanel-sur-Lausanne (CH)

(73) Assignee: AUDIO TECHNOLOGY SWITZERLAND S.A., Romanel-sur-Lausanne (CH)

( * ) Notice: Subject to any disclaimer, the term of this patent is extended or adjusted under 35 U.S.C. 154(b) by 44 days.

(21) Appl. No.: 16/366,517

(22) Filed: Mar. 27, 2019

(51) Int. Cl.
*H04N 5/235* (2006.01)
*G03B 7/093* (2006.01)
*H04N 5/232* (2006.01)
*H04N 7/01* (2006.01)

(52) U.S. Cl.
CPC ........... *H04N 5/2352* (2013.01); *G03B 7/093* (2013.01); *H04N 5/2351* (2013.01); *H04N 5/2353* (2013.01); *H04N 5/23232* (2013.01); *H04N 7/0127* (2013.01)

(58) Field of Classification Search
CPC .. H04N 5/23232; H04N 5/235; H04N 5/2351; H04N 5/2352; H04N 5/2353; H04N 7/0127; H04N 13/139; H04N 21/234381; H04N 21/440281; G03B 7/00; G03B 7/093; G03B 7/099; G03B 7/09979; G09G 2340/0435
See application file for complete search history.

(56) References Cited

U.S. PATENT DOCUMENTS

| | | | | |
|---|---|---|---|---|
| 7,245,320 B2* | 7/2007 | Kaplinsky | ............ | H04N 5/2353 348/229.1 |
| 7,688,359 B2* | 3/2010 | Zhao | .................... | H04N 5/2351 348/221.1 |
| 8,436,914 B2* | 5/2013 | Proca | .................... | H04N 5/243 348/230.1 |
| 2001/0035908 A1* | 11/2001 | Kim | .................... | H04N 5/2353 348/221.1 |
| 2005/0057666 A1* | 3/2005 | Hu | .................... | H04N 5/2351 348/229.1 |

* cited by examiner

*Primary Examiner* — Lin Ye
*Assistant Examiner* — Chriss S Yoder, III
(74) *Attorney, Agent, or Firm* — DLA Piper LLP (US)

(57) ABSTRACT

The present disclosure is related to the acquisition of images with an image sensor. It is proposed a variable frame rate acquisition method that accommodates a fixed output frame rate. The exposure time is modified not only within the range of the current acquisition frame rate but the frame rate is modified to take into account the brightness level of the acquired image. The method of the present invention produces a fixed frame rate whatever the acquisition frame rate is defined by duplicating the images (lower acquisition frame rate) or skipping some images (higher acquisition frame rate).

15 Claims, 2 Drawing Sheets

| 1 | 1 | 1 | 1 | 1 |
|---|---|---|---|---|
| 1 | 2 | 2 | 2 | 1 |
| 1 | 2 | 3 | 2 | 1 |
| 1 | 2 | 2 | 2 | 1 |
| 1 | 1 | 1 | 1 | 1 |

Fig. 3

METHOD AND DEVICE TO ACQUIRE IMAGES WITH AN IMAGE SENSOR DEVICE

INTRODUCTION

The present disclosure is related to the acquisition of images with an image sensor. In some applications, in particular when the thickness is an issue, the image sensor is used without the presence of a shutter. In this case, the image sensor is directly exposed to the incoming light and the sensor converts the light into an electric signal.

Cameras that are integrated in small consumer products generally use CMOS sensors, which are usually cheaper and have lower power consumption in battery powered devices than CCDs. CCD sensors are used for high end broadcast quality video cameras, and (C) MOS sensors dominate in still photography and consumer goods where overall cost is a major concern. Both types of sensor accomplish the same task of capturing light and converting it into electrical signals.

Each cell of a CCD image sensor is an analog device. When light strikes the chip it is held as a small electrical charge in each photo sensor. The charges in the line of pixels nearest to the (one or more) output amplifiers are amplified and output, then each line of pixels shifts its charges one line closer to the amplifier(s), filling the empty line closest to the amplifiers(s). This process is then repeated until all the lines of pixels have had their charge amplified and output.

A CMOS image sensor has an amplifier for each pixel compared to the few amplifiers of a CCD. This results in less area for the capture of photons than a CCD, but this problem has been overcome by using micro lenses in front of each photodiode, which focus light into the photodiode that would have otherwise hit the amplifier and not be detected. Some CMOS imaging sensors also use Back-side illumination to increase the number of photons that hit the photodiode. CMOS sensors can potentially be implemented with fewer components, use less power, and/or provide faster readout than CCD sensors. They are also less vulnerable to static electricity discharges.

Another design, a hybrid CCD/CMOS architecture (sold under the name "sCMOS") consists of CMOS readout integrated circuits (ROICs) that are bump bonded to a CCD imaging substrate—a technology that was developed for infrared staring arrays and has been adapted to silicon-based detector technology. Another approach is to utilize the very fine dimensions available in modern CMOS technology to implement a CCD like structure entirely in CMOS technology: such structures can be achieved by separating individual poly-silicon gates by a very small gap; though still a product of research hybrid sensors can potentially harness the benefits of both CCD and CMOS imagers.

SHORT DESCRIPTION OF THE INVENTION

The CMOS image sensor can be parameterized to acquire images at a given frame rate. The complexity of a low power and highly miniaturized sensor is limited and the functionalities available with such sensors are limited. For example, the sensor comprises only a discrete electronic to control the functioning of the acquisition and the frame rate cannot be adjusted at will. In order to set up the image sensor, the frame rate should be selected (for example 5 fps, 10 fps, 20 fps, 40 fps) and the exposure time. The exposure time is the time allowed to a given cell to acquire the incoming light before it is converted into digital value.

According to one embodiment, the frame rate is selected by applying a predefined clock frequency to the sensor chip. In an example, applying 2 MHz to the sensor results in a frame rate of 40 fps. Accordingly, applying 500 kHz to the same sensor results in an acquisition rate of 10 fps.

According to another embodiment, the frequency applied to the image sensor is a fixed frequency and the selection of the frame rate is passed via a command to the sensor. In this case, an internal divider is set according to the selection received.

The present disclosure proposes a solution for low lighting conditions. The scope of the present disclosure is a miniature camera module comprising an image sensor device, a processor and a memory. The images acquired by the image sensor are stored into the memory to be later processed by a video player. One condition to use a standard video player is to have a fixed frame rate. This frame rate is stored in a metadata area inside the video file. For surveillance applications, a frame rate of 20 fps is widely accepted. This frame rate is called the output frame rate and can vary from 10 fps to 100 fps.

According to the present disclosure, the acquisition method comprises:

a. selecting an output frame rate, b. selecting a current acquisition frame rate and a current exposure time, c. acquiring an image from an image sensor according to the current exposure time and the current acquisition frame rate, d. calculating a current brightness level from the acquired image, e. determining an updated exposure time based on a target brightness level, f. if the updated exposure time is higher than the maximum exposure time at the current frame rate, setting a lower current frame rate, g. if the updated exposure time is smaller than the minimum exposure time at the current frame rate, setting a higher current frame rate, h. if the current frame rate is higher than the output frame rate, discarding selectively the acquired image in order to accommodate the output frame rate, j. if the current frame rate is equal to the output frame rate, storing the acquired image, k. if the current frame rate is lower than the output frame rate, storing the acquired image several time in order to accommodate the output frame rate, l. repeating the steps c to k.

One main aspect of the present disclosure is the constraint of the predefined output frame rate. In some circumstances, the maximum exposure time, defined as the time between two acquisitions at the output frame rate, is not sufficient to obtain a satisfactory image. In this case, the exposure time is therefore increased and the output frame rate cannot be respected.

SHORT DESCRIPTION OF THE FIGURES

The present disclosure will be better understood thanks to the attached figures, given as not limiting examples namely:

FIG. 3 illustrates one example of the calculation of the average brightness.

DETAILED DESCRIPTION

Hardware Description

Figure 1:
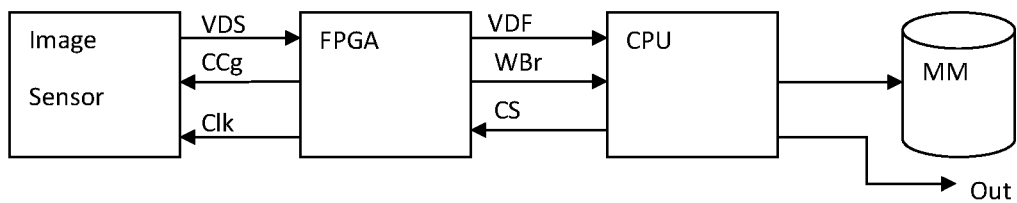
FIG. 1 illustrates the main components of a video acquisition module.

The FIG. 1 illustrates the four main components of a video acquisition module. The image sensor is connected to a control device (FPGA) that feeds the image sensor with the necessary signals. The control device FPGA transmits the clock CLK defining the acquisition frame rate and the Integration Delay defining the exposure time. In return, the image sensor transmits the digital value for each pixel in serial mode.

In a case of an image sensor having 300 lines and an acquisition frame rate of 10 fps, an image is acquired every 100 ms, which means that while one row is being read every 100 ms, the other rows are in integrating mode (299 are integrating and only 1 in read mode), making a maximal integration time of 99.66 ms. This time can be decreased by delaying the freshly acquired row to start integrating the light. In the case that the Integration Delay is set at 10 ms, the exposure time of one row will be:

Exposure time=Maximal integration time−Integration Delay=89.66 ms.

Since the maximal integration time is directly dependant of the frame rate, the Integration Delay should be newly defined each time the frame rate is adjusted.

The Integration Delay is particular to one embodiment. However, other image sensors can work differently and the exposure time can be set actively. For the rest of the description, we will use the expression "exposure time" and increasing the exposure time has the consequence to increase the time a pixel is integrating the light. In reference of the example above, this means that the Integration Delay will be decreased.

The information configuration parameters CCg comprises the "Exposure Time" and is passed from the control device to the image sensor. Some image sensors further comprises an adjustable gain (ADC Gain) in the conversion from the analog value, as integrated by a pixel detector, to the digital value of said pixel. This ADC Gain can be also part of the configuration parameters CCg. In return, the image sensor comprises a serial output line VDS transferring the digital value of each pixel in a serial mode.

The role of the FPGA is to interface the image sensor with the processing unit CPU. The image data are converted into frame data and transmitted to the processing unit CPU. The configuration parameters CCg sent to the image sensor are obtained from the processing unit CPU. The processing unit can set the ADC Gain and the exposure time. The FPGA parameters CS transmitted by the processing unit CPU comprises the proper clock according to the frame rate selected by the processing unit CPU, the exposure time and if available, the ADC Gain.

Finally, the processing unit CPU produces a video file that can be stored in the memory MM or outputted (see OUT in FIG. 1) for processing by another device.

Method to Adjust the Frame Rate

Figure 2:
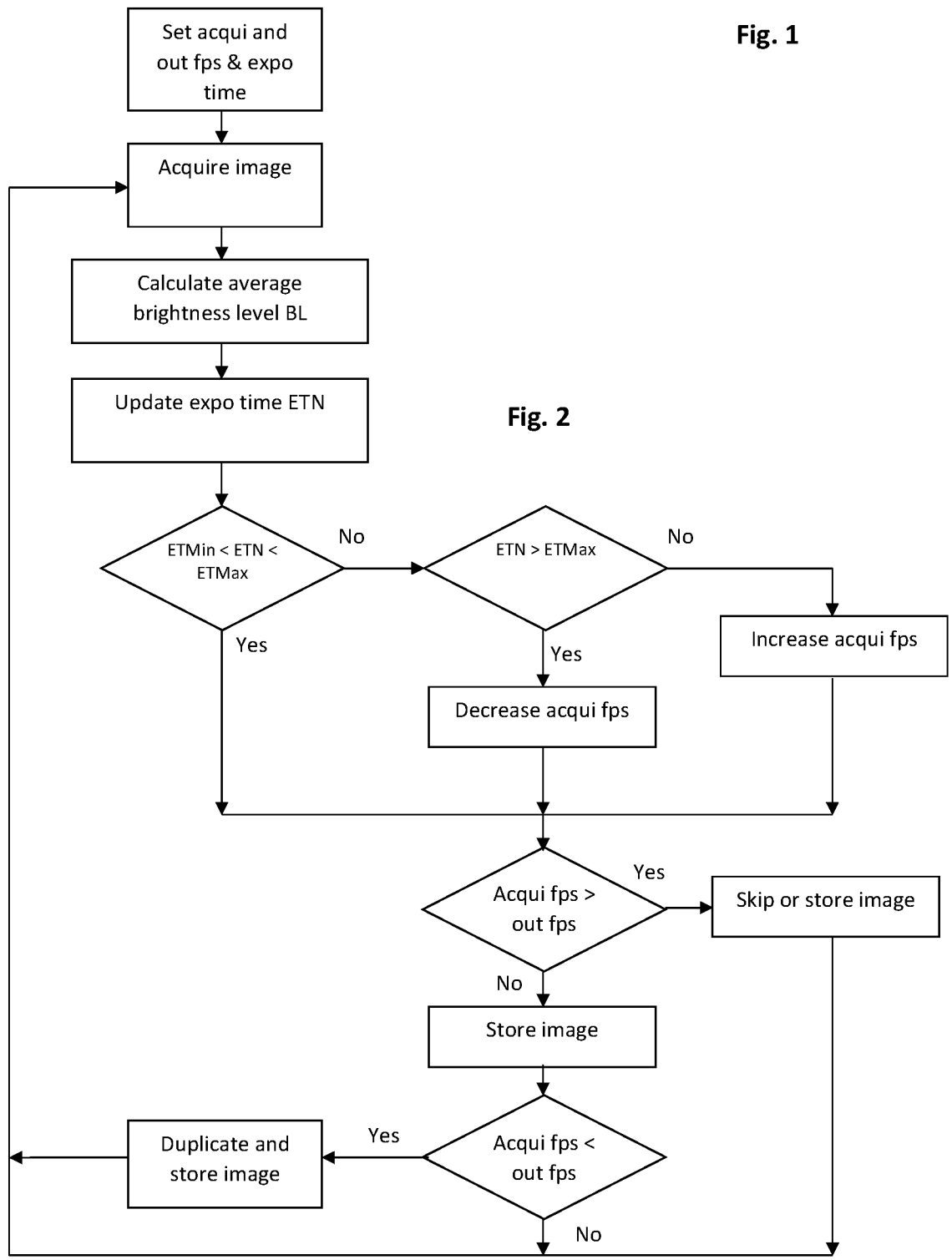
FIG. 2 illustrates a first mode of realization with the duplication of a frame (or frames) to accommodate the storage frame rate.

FIG. 2 shows the steps executed by the processing unit CPU in cooperation with the FPGA and the image sensor.

To begin with, the output frame rate OFR is set according to the type of video output desired. The resulting video file available for further processing can be outputted in different ways. According to a first mode, the video data are stored into a local memory MM for further use. According to another mode, the video file is outputted to an external device such as a display or transmitted to a remote location.

The initial configuration is set by the processing unit CPU and the FPGA parameters are transferred to the FPGA. These initial parameters comprise at least the acquisition frame rate AFR and the exposure time, these parameters being the default values or values last used by the camera module.

When these parameters are loaded into the image sensor, the acquisition of an image can start. The Image Sensor transfers the acquired image converted from the analog signal to digital data to the processing unit CPU via the control unit FPGA. The newly acquired digital image is temporarily stored in a memory of the processing unit CPU for further processing.

The FPGA is configured to calculate an average brightness of the acquired image in order to determine if the exposure time is optimal.

For that purpose, various methods can be used, the simplest one being to calculate an average on all pixel values of the image.

Figure 3:
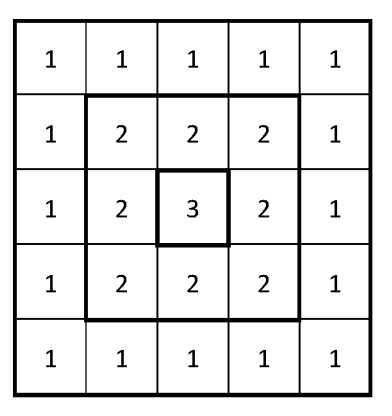

According to another embodiment, the average brightness is calculated taking into account the position of a pixel in the image. The FIG. 3 illustrates an example of this embodiment in which the image was divided into three zones, a central zone, a middle zone and a peripheral zone. A particular weight is applied depending on the zone in which the pixel is located. In this example, the image is divided into 25 blocks and the center block is awarded by a higher weight (e.g. 3). The middle blocks are granted another weight for example 2 and the peripheral blocks are weighted 1. In this configuration, the brightness of the central block plays a more important role in the calculation. The number of blocks as well as the weights allocated for these blocks can be changed depending on the type of image that the camera module is designed to acquire.

When the average brightness BL is determined, the processing unit CPU can determine the updated exposure time ETN in order to obtain the optimal brightness OBL.

This can be achieved by the formula:

$$\frac{\text{Current Exposure time}}{\text{Updated Exposure time}} = \frac{\text{Average Brightness}}{\text{Optimal Brightness}}$$

According to a first embodiment, the calculated Updated Exposure time is used without modification. According to a second embodiment, a filtering function is applied to the Updated Exposure Time in order to have a smooth transition between the acquired image and the next image. Various filtering methods can be applied, typically the difference would be filtered by a low pass filter.

Another filtering method can be applied by successive approximation. In the example above, the Current Exposure Time should be changed from 0.1 ms to 0.2 ms. A percentage of the difference is calculated for example 50% and applied to the Updated Exposure Time. As a consequence, the Updated Exposure Time will be 0.15 ms for the next acquisition. In case that the brightness of the image is the same, in the next round, the difference between the Current and the Update will be 0.05 ms. The next Updated Exposure Time will be 0.175 ms since only 50% of the difference is used to update the Exposure Time.

Once the Updated Exposure Time is determined, the processing unit CPU checks if this new value is within the working range with the current acquisition rate. The definition of working range Min/Max will define the way the transition is made from one fps to another. The MIN/Max are not necessarily the physical min and max for a given fps. If it would be the case, in case of high illumination, the exposure time will be set close to zero and the fps will always stay the same. In some instances, we can optimize the fps to produce a better quality video feed.

The table below indicates examples of the Min/Max of the exposure time (in milliseconds) according to the acquisition frame rate:

| Frame Rate | Min | Max |
| --- | --- | --- |
| 5 fps | 105 | 200 |
| 10 fps | 40 | 120 |
| 20 fps | 0.8 | 49 |
| 40 fps | 0.4 | 6 |

These values are stored in a memory of the processing unit CPU.

In some instances, the Min and the Max are not the physical limits resulting from the frame rate but a limit that trigs the change of the frame rate. For example, the Max=120 ms for 10 fps is the limit to change to 5 fps although the technical limit is below (100 ms). With the definition of these limits, the processing unit CPU can optimize the change of fps. With 120 ms for the maximum at 10 fps, in case the Updated Exposure Time is calculated at 115 ms, the real exposure time will be smaller (in our case 100 ms) resulting of an image with an average brightness slightly below the optimal brightness. In this case, it is preferable to continue at 10 fps even if the average brightness is not optimal.

In the example of 105 ms at 5 fps, it is again not the physical limit at that rate but a limit to which the fps will be changed to 10 fps. By adjusting the limits, we can favor a quick change to a higher frame rate or refrain to reduce the frame rate if not necessary.

With the Updated Exposure Time ETN, the processing unit CPU verifies if it is within the working range Min/Max as predefined for the current frame rate. In the positive event, the current frame rate is not changed.

In case the Updated Exposure Time ETN is no longer within the Min/Max for the current frame rate, the frame rate is adjusted. For ETN>Max, the frame rate is reduced to the next available fps. For ETN<Min, the frame rate is increased at the next available frame rate.

According to an embodiment of the invention, we have a fixed number of available frame rates i.e. 5, 10, 20, 40 and 80 fps.

The next step is to produce the acquired image to the output. The output has a predefined output frame rate that can be the same or be different than the current frame rate. In the first case, the acquired image is simply transferred to the output (to be stored according to one embodiment).

In case the output frame rate is smaller than the current frame rate, the acquired image will be transferred to the output at the output frame rate meaning that some images will be discarded. In case the output frame rate is 20 fps and the acquisition frame rate is 40 fps, every other image will be discarded.

In case the output frame rate is higher than the acquisition frame rate, the acquired image is duplicated so as to accommodate the output frame rate. By duplicating, we understand copying the image a number of times to produce the output frame rate. In an example in which the acquisition frame rate is 10 fps and the output frame rate is 40 fps, the acquired image will be produced four times to the output in order to obtain the targeted output frame rate.

ADC Gain

Gain is a digital camera setting that controls the amplification of the signal from the camera sensor. It should be noted that this amplifies the whole signal, including any associated background noise.

Gain can be before or after the analog-to-digital converter (ADC). However, it is important to note that gain after the ADC causes loss of dynamic range.

A gain applied before the ADC can be useful for taking full advantage of the bit-depth of the camera in low light conditions, although it is almost always the case that careful lighting is more desirable. Some image sensors comprise the capability to adjust the gain in the analog to digital conversion of the pixel value. An amplifier is located between the pixel analog voltage output and the input of the ADC. The charge resulting of the photons is coupled to the ADC through a selectable gain amplifier. The gain is selected so that the maximum number of electrons holding in a pixel (before they start to leak outwards) results in the full scale digital value. This default gain can be adjusted to optimize the process described above.

In the present example, the image sensor comprises only two gain values, i.e. 1 or 0.5. According to a first embodiment, the pixel gain is used only when the acquisition frame rate is the maximum for the image sensor therefore the lighting conditions are good. In our example, 40 fps is the maximum frame rate for this camera module and the pixel gain can be reduced to 0.5. According to the decision tree explained above, if the frame rate is decreased to 20 fps, the pixel gain is set to 1.

According to another embodiment, the pixel gain is decreased as soon as the acquisition frame rate is higher than the output frame rate. In one example, the output frame rate is set to 10 fps and each time the frame rate is set to a higher value, the pixel gain is reduced.

User Interaction

The miniature camera comprises at least one input to receive a command tog activate or stop the process. The process explained above is initiated at the reception of a start command. This start command can be received through a single button located on the miniature camera case, via an electronic signal received by a logical input of the camera or a wireless command received by a wireless receiver of the miniature camera.

In the same manner, a stop command can be received by the miniature camera via the same inputs. At the reception of the stop command, the processor stops the acquisition of images and sends to its video output a signal informing of the end of the video file. In case that the miniature camera comprises a memory, the current file in which the outputted images were stored is closed by a suitable marker in the memory.

CONCLUSION

We have described a variable frame rate acquisition method that accommodates a fixed output frame rate. The exposure time is modified not only within the range of the current acquisition frame rate but the frame rate is modified to take into account the brightness level of the acquired image. The method of the present invention produces a fixed frame rate whatever the acquisition frame rate is defined by duplicating the images (lower acquisition frame rate) or skipping some images (higher acquisition frame rate).

This method is executed by a processing unit in the form of a software program stored in an executable memory of the processing unit.

The invention claimed is:

1. A video acquisition method executed by a processor of a miniature camera, comprising:
   a. selecting an output frame rate;
   b. selecting a current acquisition frame rate and a current exposure time;
   c. acquiring an image from an image sensor according to the current exposure time and the current acquisition frame rate;
   d. calculating a current brightness level from the acquired image;
   e. determining an updated exposure time based on a target brightness level;
   f. if the updated exposure time is higher than the maximum exposure time at the current frame rate, setting a lower current frame rate;
   g. if the updated exposure time is smaller than the minimum exposure time at the current frame rate, setting a higher current frame rate;
   h. if the current frame rate is higher than the output frame rate, discarding selectively the acquired image in order to accommodate the output frame rate;
   j. if the current frame rate is equal to the output frame rate, outputting the acquired image;
   k. if the current frame rate is lower than the output frame rate, outputting the acquired image several times in order to accommodate the output frame rate;
   l. repeating the steps c to k until receiving a stop command.

2. The method of claim 1 wherein current brightness level is determined by averaging all pixel data of the acquired image.

3. The method of claim 1 wherein current brightness level is determined by allocating weight to pixel data depending of their location and averaging the pixel data taking into the weigh allocated to each pixel data.

4. The method of claim 3 wherein the acquired image is divided in at least two zones, a central zone and peripheral zone, a first weight is allocated to the pixel data of the central zone and a second weight is allocated to the pixel data of the peripheral zone.

5. The method of claim 4 wherein the first weight is higher than the second weight.

6. The method of claim 1 wherein the Update Exposure Time is calculated as follows:

$$\text{Updated Exposure Time} = \frac{\text{Current Exposure time} \times \text{Optimal Brightness Level}}{\text{Current Brightness Level}}$$

7. The method of claim 1, further comprising, filtering the calculated Updated Exposure Time in order to have a smooth transition between the acquired image and the next image.

8. The method of claim 1 wherein the current acquisition frame rate and the output frame rate are selected among 5 fps, 10 fps, 20 fps, 40 fps and 80 fps.

9. The method of claim 8, wherein the current frame rate is doubled while setting a higher current frame rate.

10. The method of claim 8, wherein the current frame rate is divided by two while setting a lower current frame rate.

11. The method of claim 1, wherein the miniature camera module comprises a memory, and it comprises storing the outputted image into the memory.

12. The method of claim 1, wherein the image sensor further comprises an adjustable ADC gain, the method comprising, reducing the gain while the current acquisition frame rate is higher than the output frame rate.

13. The method of claim 1, wherein the image sensor further comprises an adjustable ADC gain, the method comprising, setting the maximum gain while the current acquisition frame rate is equal or lower than the output frame rate.

14. A miniature camera comprising an image sensor and a processor, said processor being configured to:
   a. select an output frame rate;
   b. select a current acquisition frame rate and a current exposure time;
   c. acquire an image from an image sensor according to the current exposure time and the current acquisition frame rate;
   d. calculate a current brightness level from the acquired image;
   e. determine an updated exposure time based on a target brightness level;
   f. if the updated exposure time is higher than the maximum exposure time at the current frame rate, set a lower current frame rate;
   g. if the updated exposure time is smaller than the minimum exposure time at the current frame rate, set a higher current frame rate;
   h. if the current frame rate is higher than the output frame rate, discard selectively the acquired image in order to accommodate the output frame rate;
   j. if the current frame rate is equal to the output frame rate, output the acquired image;
   k. if the current frame rate is lower than the output frame rate, output the acquired image several times in order to accommodate the output frame rate;
   l. repeat the steps c to k until receiving a stop command.

15. The miniature camera of claim 14, further comprising a memory, said processor being configured to store the outputted image into the memory.

* * * * *